(12) United States Patent
Mitsui et al.

(10) Patent No.: US 9,468,918 B2
(45) Date of Patent: Oct. 18, 2016

(54) METAL-SUPPORTED CRYSTALLINE SILICOALUMINOPHOSPHATE NOX-REDUCING CATALYST

(71) Applicant: JGC CATALYSTS AND CHEMICALS LTD., Kawasaki-shi, Kanagawa (JP)

(72) Inventors: Tomohiro Mitsui, Kitakyushu (JP); Yuka Seto, Kitakyushu (JP); Takaki Mizuno, Kitakyushu (JP); Tsuguo Koyanagi, Kitakyushu (JP)

(73) Assignee: JGC CATALYSTS AND CHEMICALS LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 14/702,268

(22) Filed: May 1, 2015

(65) Prior Publication Data
US 2015/0231619 A1   Aug. 20, 2015

Related U.S. Application Data

(62) Division of application No. 12/926,914, filed on Dec. 17, 2010, now abandoned.

(30) Foreign Application Priority Data

Dec. 18, 2009 (JP) ................ 2009-287187
Mar. 3, 2010 (JP) ................ 2010-046044

(51) Int. Cl.

| | | |
|---|---|---|
| B01J 27/182 | (2006.01) | |
| B01J 29/06 | (2006.01) | |
| B01J 29/85 | (2006.01) | |
| B01J 23/72 | (2006.01) | |
| B01J 35/02 | (2006.01) | |
| B01J 35/00 | (2006.01) | |
| B01J 23/745 | (2006.01) | |
| B01J 29/70 | (2006.01) | |
| B01J 29/72 | (2006.01) | |
| B01J 29/83 | (2006.01) | |
| B01J 29/76 | (2006.01) | |
| B01D 53/56 | (2006.01) | |
| B01D 53/58 | (2006.01) | |
| B01D 53/94 | (2006.01) | |

(52) U.S. Cl.
CPC ............... B01J 29/85 (2013.01); B01J 23/72 (2013.01); B01J 23/745 (2013.01); B01J 29/7065 (2013.01); B01J 29/723 (2013.01); B01J 29/763 (2013.01); B01J 29/83 (2013.01); B01J 35/0006 (2013.01); B01J 35/026 (2013.01); B01D 53/56 (2013.01); B01D 53/58 (2013.01); B01D 53/9418 (2013.01); B01J 35/023 (2013.01); B01J 2229/186 (2013.01)

(58) Field of Classification Search
USPC ...................................... 502/64, 66, 213, 214
See application file for complete search history.

(56) References Cited

U.S. PATENT DOCUMENTS

2004/0262197 A1* 12/2004 McGregor ........... C10G 11/182
                                                    208/120.01
2008/0108857 A1*  5/2008 Wilson ................. B01J 29/84
                                                    585/639

* cited by examiner

*Primary Examiner* — Elizabeth Wood
(74) *Attorney, Agent, or Firm* — Manabu Kanesaka

(57) ABSTRACT

An aluminum phosphate-modified metal-supported crystalline silicoaluminophosphate NOx-reducing catalyst includes metal-supported crystalline silicoaluminophosphate particles having a surface modified with aluminum phosphate.

6 Claims, No Drawings

METAL-SUPPORTED CRYSTALLINE SILICOALUMINOPHOSPHATE NOx-REDUCING CATALYST

CROSS-REFERENCE TO RELATED APPLICATIONS

The present application is a division of U.S. patent application Ser. No. 12/926,914 filed on Dec. 17, 2010, which claims priority from Japanese Patent Application Nos. 2009-287187 filed on Dec. 18, 2009 and 2010-046044 filed on Mar. 3, 22010.

TECHNICAL FIELD

The present invention relates to a metal-supported NOx-reducing catalyst suitable for use in exhaust gas treatment in internal combustion engines with an enhanced exhaust gas treatment efficiency and a process for producing the same.

BACKGROUND ART

Contaminants such as HC (hydrocarbons), CO (carbon monoxide), NOx (nitrogen oxide), and PM (particulate matter) are contained in exhaust gases discharged from diesel engines. Among these contaminants, NOx cannot be purified by three-way catalysts, which have been put to practical use in oxidation catalysts and gasoline automobiles, without difficulties, and, thus, selective reduction-type NOx catalysts (hereinafter referred to as "SCR catalysts") are under development as promising NOx-purifying catalysts.

Catalysts that have a honeycomb structure and comprise an active ingredient such as V (vanadium), Cr (chromium), Mo (molybdenum), Mn (manganese), Fe (iron), Ni (nickel), Cu (copper), Ag (silver), Au (gold), Pd (palladium), Y (yttrium), Ce (cerium), Nd (neodymium), W (tungsten), In (indium), or Ir (iridium) supported on a carrier, for example, $TiO_2$, two-way composite oxides such as $SiO_2$—$TiO_2$, $WO_3$—$TiO_2$, or $SiO_2$—$TiO_2$, or three-way composite oxides such as $WO_3$—$SiO_2$—$TiO_2$, or $MoO_3$—$SiO_2$—$TiO_2$ are known as SCR catalysts. According to the following formulae, these exhaust gas treatment catalysts reduce NOx in the presence of a reducing agent such as ammonia to convert NOx to nitrogen gas and thus to purify NOx.

$$4NO+4NH_3+O_2 \rightarrow 4N_2+6H_2O \quad (1)$$

$$NO+NO_2+2NH_3 \rightarrow 2N_2+3H_2O \quad (2)$$

$$6NO_2+8NH_3 \rightarrow 7N_2+12H_2O \quad (3)$$

Catalysts comprising a monolith carrier with a supported layer formed thereon, the supported layer being formed of fine particles having catalytic activity such as fine particles of zeolite, are also known.

Further, Japanese Patent Application Laid-Open No. 33664/2003 (Patent Document 1) describes that alumina, zirconia, titania, zeolite, SiC, SiN, mullite, lithium aluminum silicate (LAS), titanium phosphate, perovskite, spinel, chamotte, and non-oriented cordierite are usable as a main constituent material for cell walls of honeycomb catalysts for exhaust gas purification and, among them, titanium oxide, zeolite, and alumina are preferred.

Patent Document 1 describes that, for example, X-type, Y-type, ZSM-5-type, and β-type zeolites are usable as the zeolite, that, however, minimizing the content of the alkali ingredient is important from the viewpoint of heat resistance, that the $SiO_2/Al_2O_3$ ratio is preferably not less than 25, that AlPO, SAPO, metallosilicates, and layered compounds are also usable, and that catalysts with the above catalytically active ingredients supported thereon by ion exchange are also preferred.

Japanese translation of PCT publication No. 519817/2009 (Patent Document 2) discloses hydrothermally stable metal-treated zeolite catalysts for selective NOx reduction obtained by subjecting zeolite to metal ion exchange at a pH value around 3 and then hydrothermally treating the ion-exchanged zeolite at an elevated temperature of 540° C. or above.

Japanese domestic re-publication of PCT international application No. 011575/2006 (Patent Document 3) discloses denitration catalysts comprising ferric oxide supported on a β-type zeolite carrier subjected to iron ion exchange.

Conventional crystalline porous material catalysts such as the above-described zeolites, when used at 700° C. or above in a reaction that produces water, cause lowered crystallinity and specific surface area that in turn results in lowered activity. Accordingly, the development of catalysts that are hydrothermally stable and can maintain high activity for a long period of time has been demanded.

It is known that crystalline silicoaluminophosphates, even when used as catalyst carriers at elevated temperatures, cause only relatively small lowering in crystallinity and specific surface area and are stable.

Ion exchange, impregnation, and precipitation methods are known as usable in the production of catalysts comprising a metal supported on crystalline silicoaluminophosphates as a carrier, as with crystalline silicoaluminophosphates. The following facts, however, have been found: (1) a method in which ion-exchange is carried out in an aqueous metal salt solution is disadvantageous in that a metal in an amount large enough to provide satisfactory activity cannot be supported, (2) a method in which a crystalline silicoaluminophosphate is dispersed in an aqueous metal salt solution to hydrolyze the metal salt and to precipitate a metal hydroxide is disadvantageous in that the crystallinity of the crystalline silicoaluminophosphate is sacrificed, and (3) a method in which a crystalline silicoaluminophosphate is impregnated with a metal salt is disadvantageous in that satisfactory activity cannot be provided probably due to ununiformly distributed metal on the surface of pores of the crystalline silicoaluminophosphate.

Accordingly, the present inventors have made further studies and, as a result, have found that a method which comprises dispersing a crystalline silicoaluminophosphate in an aqueous active metal compound solution, spray-drying the dispersion and then calcining the spray-dried product at a high temperature can increase the amount of the metal supported and can produce a metal-supported catalyst that, even after hydrothermal treatment at elevated temperatures, does not cause a significant lowering in crystallinity and can develop a high level of activity. This has led to the completion of the present invention.

Further, it has been found that the modification of the metal-supported crystalline silicoaluminophosphate particles, obtained by the above method, with aluminum phosphate can provide a catalyst having high low-temperature activity and, in particular, supporting by the same spray drying method as described above, can provide a catalyst having high low-temperature activity. This has led to the completion of the present invention.

SUMMARY OF THE INVENTION

An object of the present invention is to provide a process for producing a metal-supported catalyst, which has high hydrothermal stability and can maintain high activity for a long period of time, and to provide a metal-supported catalyst.

Another object of the present invention is to provide an aluminum phosphate-modified metal-supported crystalline silicoaluminophosphate catalyst, which particularly has high low-temperature activity, and to provide a process for producing the same.

According to one aspect of the present invention, there is provided a process for producing a metal-supported crystalline silicoaluminophosphate catalyst, the process comprising the following steps (a) to (c) and (e):
(a) preparing a dispersion of crystalline silicoaluminophosphate particles;
(b) mixing an aqueous active ingredient metal compound solution into the dispersion;
(c) spray-drying the mixture; and
(e) heat-treating (calcining) the spray-dried product at 400 to 900° C.

Preferably, the step (c) is followed by the following step (d):
(d) washing the spray-dried product.

Preferably, the crystalline silicoaluminophosphate particles have been washed and/or calcined after the synthesis thereof.

Preferably, the crystalline silicoaluminophosphate is at least one member selected from the group consisting of SAPO-5, SAPO-11, SAPO-34, and SAPO-37.

Preferably, the crystalline silicoaluminophosphate is SAPO-34.

Preferably, the active ingredient metal compound is a compound of an element selected from the group 8, 9, 10, 11, and 12 elements of the periodic table or a mixture thereof (including an alloy).

Preferably, the amount of the active ingredient metal supported is in a range of 0.1 to 10% by weight in terms of metal.

According to another aspect of the present invention, there is provided a metal-supported crystalline silicoaluminophosphate catalyst comprising a crystalline silicoaluminophosphate with an active metal ingredient supported thereon, the metal-supported crystalline silicoaluminophosphate catalyst meeting the requirements that the retention of specific surface area as measured by BET and the retention of crystallinity after hydrothermal treatment under conditions of (1) an air atmosphere having a moisture content of 10% by volume, (2) a temperature of 700° C., and (3) a treatment time of 20 hours are not less than 80% and not less than 80%, respectively.

Preferably, the crystalline silicoaluminophosphate is at least one member selected from the group consisting of SAPO-5, SAPO-11, SAPO-34, and SAPO-37.

Preferably, the crystalline silicoaluminophosphate is SAPO-34.

Preferably, the active metal ingredient is a metal of an element selected from the group 8, 9, 10, 11, and 12 elements of the periodic table or a mixture thereof (including an alloy).

Preferably, the amount of the active metal ingredient supported is in a range of 0.1 to 10% by weight in terms of metal.

Preferably, the metal-supported crystalline silicoaluminophosphate catalyst according to the present invention is a metal-supported crystalline silicoaluminophosphate catalyst obtained by the process for producing a metal-supported crystalline silicoaluminophosphate catalyst according to any of claims 1 to 7.

According to still another aspect of the present invention, there is provided an aluminum phosphate-modified metal-supported crystalline silicoaluminophosphate catalyst comprising: metal-supported crystalline silicoaluminophosphate particles having a surface modified with aluminum phosphate, the content of aluminum phosphate in the catalyst being 0.1 to 40% by weight in terms of $Al_2O_3+P_2O_5$ based on the metal-supported crystalline silicoaluminophosphate particles.

Preferably, the value of x in $(Al_2)_X \cdot (PO_4)_3$ representing the aluminum phosphate is 0.1 to 3.

Preferably, the crystalline silicoaluminophosphate particles are at least one member selected from the group consisting of SAPO-5, SAPO-11, SAPO-34, and SAPO-37.

Preferably, the supported metal is a metal of an element selected from the group 8, 9, 10, 11, and 12 elements of the periodic table or a mixture thereof (including an alloy).

Preferably, the amount of the metal supported is in a range of 0.1 to 10% by weight in terms of metal.

According to a further aspect of the present invention, there is provided a process for producing an aluminum phosphate-modified metal-supported crystalline silicoaluminophosphate catalyst, the process comprising the following steps (f) to (i):
(f) preparing a dispersion of a metal-supported crystalline silicoaluminophosphate particles;
(g) mixing an aqueous aluminum phosphate solution into the dispersion;
(h) spray-drying the mixture; and
(i) heat-treating (calcining) the spray-dried product at 400 to 700° C.

Preferably, the metal-supported crystalline silicoaluminophosphate particles have been obtained by the following steps (a) to (c) and (e):
(a) preparing a dispersion of crystalline silicoaluminophosphate particles;
(b) mixing an aqueous active ingredient metal compound solution into the dispersion;
(c) spray-drying the mixture; and
(e) heat-treating (calcining) the spray-dried product at 400 to 900° C.

Preferably, the step (c) is followed by the following step (d):
(d) washing the spray-dried product.

Preferably, the crystalline silicoaluminophosphate particles have been washed and/or calcined after the synthesis thereof.

Preferably, the crystalline silicoaluminophosphate particles are at least one member selected from the group consisting of SAPO-5, SAPO-11, SAPO-34, and SAPO-37.

Preferably, the active ingredient metal compound is a compound of an element selected from the group 8, 9, 10, 11, and 12 elements of the periodic table or a mixture thereof (including an alloy).

Preferably, the amount of the active ingredient metal supported is in a range of 0.1 to 10% by weight in terms of metal based on the crystalline silicoaluminophosphate particles.

According to another aspect of the present invention, there is provided a NOx reducing catalyst for exhaust gas treatment that is any of the above metal-supported crystalline silicoaluminophosphate catalysts or aluminum phosphate-modified metal-supported crystalline silicoaluminophosphate catalysts.

The present invention can provide a metal-supported crystalline silicoaluminophosphate catalyst and a NOx reducing catalyst for exhaust gas treatment that have high hydrothermal stability at ultrahigh temperatures of approximately 700° C. or above. The metal-supported crystalline silicoaluminophosphate catalyst and the NOx reducing catalyst for exhaust gas treatment can maintain high activity for a long period of time.

The aluminum phosphate-modified metal-supported crystalline silicoaluminophosphate catalyst has high low-temperature activity.

The process for producing a metal-supported crystalline silicoaluminophosphate catalyst according to the present invention is simple in steps and has excellent cost effectiveness.

EMBODIMENTS OF THE INVENTION

[1] Process for Producing Metal-Supported Crystalline Silicoaluminophosphate Catalyst The process for producing a metal-supported crystalline silicoaluminophosphate catalyst according to the present invention comprises the following steps (a) to (c) and (e) and preferably further comprises step (d) between the step (c) and the step (e):
- (a) the step of preparing a dispersion of crystalline silicoaluminophosphate particles;
- (b) the step of mixing an aqueous active ingredient metal compound solution into the dispersion;
- (c) the step of spray-drying the mixture;
- (d) the step of washing the spray-dried product; and
- (e) the step of heat-treating (calcining) the product at 400 to 900° C.

Step (a)

A dispersion of crystalline silicoaluminophosphate particles is prepared.

Conventional crystalline silicoaluminophosphate particles may be used as the crystalline silicoaluminophosphate particles in the present invention (U.S. Pat. No. 4,440,871, Apr. 3, 1984.

"Microporous and Mesoporous Materials" 53 (2002) 97-108).

At least one material selected from SAPO-5, SAPO-11, SAPO-34, and SAPO-37 is preferred as the crystalline silicoaluminophosphate.

Among others, SAPO-34 is suitable because it is excellent in thermal stability at elevated temperatures, particularly in hydrothermal stability and, when used as SCR catalysts and the like, has high level of activity and selectivity that can be maintained for a long period of time.

The crystalline silicoaluminophosphate is a porous crystalline composite oxide comprising silica, alumina, and phosphorus oxide.

SAPO-34, which is an crystalline silicoaluminophosphate, has a silica content of approximately 1 to 12% by weight in terms of $SiO_2$, an alumina content of approximately 35 to 45% by weight in terms of $Al_2O_3$, and a phosphorus oxide content of approximately 45 to 55% by weight in terms of $P_2O_5$ and has a specific surface area of approximately 500 to 750 m$^2$/g.

Preferably, the crystalline silicoaluminophosphate particles have an average diameter of 0.1 to 7 μm, more preferably 0.2 to 3 μm, although the preferred average particle diameter also varies depending upon the form of the catalyst.

When the average particle diameter of the crystalline silicoaluminophosphate particles is less than 0.1 μm, the hydrothermal stability is sometimes unsatisfactory.

Crystalline silicoaluminophosphate particles having an average particle diameter exceeding 7 μm, when used as a molded product, are sometimes unsatisfactory, for example, in strength and attrition resistance.

In the present invention, the average particle diameter is determined by taking scanning electron photomicrographs (SEMs) of crystalline silicoaluminophosphate particles, measuring the diameters of any 100 particles, and determining the average value of the measured diameters.

The crystalline silicoaluminophosphate particles are usually synthesized by hydrothermally treating a mixture of a silica source, an alumina source, a phosphorus oxide source, and an organic crystallizing agent (sometimes referred to as "template") and, after the synthesis, usually contain the organic crystallizing agent.

For example, tetraethylammonium hydroxide and isopropylammonium hydroxide are usable as the organic crystallizing agent.

In general, for example, the organic crystallizing agent is removed by calcining at 500 to 600° C. to support the metal.

In the present invention, the calcined crystalline silicoaluminophosphate particles may be used. Crystalline silicoaluminophosphate particles that, after the synthesis, has been washed and optionally dried, that is, organic crystallizing agent-containing crystalline silicoaluminophosphate particles as such may be used.

The use of the organic crystallizing agent-containing crystalline silicoaluminophosphate particles as such advantageously can realize improved hydrothermal stability at elevated temperatures, can realize improved activity and selectivity and, in addition, can realize improved productivity and cost effectiveness because the step of calcining for the removal of the organic crystallizing agent is unnecessary, although the reason why such advantages can be obtained has not been elucidated yet.

The crystalline silicoaluminophosphate particles are dispersed in water to prepare a dispersion.

The concentration of the dispersion of the crystalline silicoaluminophosphate particles is not particularly limited, as long as the dispersion can be mixed with an aqueous active ingredient metal compound solution, which will be described later, and can allow a mixed dispersion, for spray drying, having a regulated concentration, which will be described later, to be prepared.

Step (b)

An aqueous active ingredient metal compound solution is mixed into the dispersion.

In the present invention, a metal of an element selected from the group 8, 9, 10, 11, and 12 elements of the periodic table or a mixture thereof (including an alloy) is used as the active ingredient metal. Accordingly, for the active ingredient metal, Fe (iron) and Ru (ruthenium) may be mentioned as the group 8 metal of the periodic table, and specific examples of compounds of such metals include iron nitrate, iron acetate, iron chloride, ferrous sulfate, ferric sulfate, ruthenium nitrate, and ruthenium chloride.

Co (cobalt), Rh (rhodium), and Ir (iridium) may be mentioned as the group 9 metal of the periodic table, and specific examples of compounds of such metals include cobalt nitrate, cobalt chloride, cobalt oxalate, cobalt sulfate, rhodium nitrate, and iridium nitrate.

Ni (nickel), Pd (palladium), and Pt (platinum) may be mentioned as the group 10 metal of the periodic table, and specific examples of compounds of such metals include nickel nitrate, nickel acetate, nickel carbonate, nickel chloride, palladium nitrate, and chloroplatinic acid.

Cu (copper), Ag (silver), and Au (gold) may be mentioned as the group 11 metal of the periodic table, and specific examples of compounds of such metals include cupric nitrate, silver nitrate, and chlorauric acid.

Zn (zinc) and Cd (cadmium) may be mentioned as the group 12 metal of the periodic table, and specific examples of compounds of such metals include zinc nitrate and cadmium nitrate.

An aqueous solution of the metal compound is prepared and is mixed with the dispersion of the crystalline silicoaluminophosphate particles prepared in the step (a) to prepare a mixed dispersion, for spray drying, composed of the crystalline silicoaluminophosphate particles and the metal compound.

In the present invention, the use of the organic crystallizing agent-containing crystalline silicoaluminophosphate particles as such increases the pH value of the dispersion, leads to the formation of precipitates for some types of metal compounds which will be described later, and makes it impossible to evenly support the active metal on the crystalline silicoaluminophosphate, which sometimes render the activity unsatisfactory.

For this reason, preferably, the pH value of the mixed dispersion is previously adjusted to approximately 1 to 6, although this also varies depending upon the type of the metal compound.

The crystalline silicoaluminophosphate particles and the metal compound are mixed together at such a mixing ratio that the content of the metal in the finally obtained metal-supported crystalline silicoaluminophosphate catalyst is 0.1 to 10% by weight, preferably 0.2 to 8% by weight.

When the content of the metal in the metal-supported crystalline silicoaluminophosphate catalyst is less than 0.1% by weight, the metal-supported crystalline silicoaluminophosphate catalyst, when used in a NOx reduction reaction, sometimes has unsatisfactory activity at low temperatures (100 to 250° C.). Further, catalysts having the same properties as this metal-supported crystalline silicoaluminophosphate catalyst can be provided by processes other than the process of the present invention.

When the content of the metal in the metal-supported crystalline silicoaluminophosphate catalyst exceeds 10% by weight, dispersing and supporting the metal is difficult. In this case, even though the metal-supported crystalline silicoaluminophosphate catalyst can be successfully prepared, a further improvement in activity cannot be achieved and, rather, in some cases, the activity is lowered.

Preferably, the concentration of the mixed dispersion for spray drying is 1 to 35% by weight, more preferably 2 to 20% by weight, in terms of the solid content of the crystalline silicoaluminophosphate particles.

When the concentration of the mixed dispersion for spray drying is less than 1% by weight in terms of the solid content of the crystalline silicoaluminophosphate particles, the productivity and the cost effectiveness are lowered. On the other hand, when the concentration exceeds 35% by weight, the activity of the catalyst is sometimes unsatisfactory, although the reason for this has not been elucidated yet.

Step (c)

Subsequently, the mixture is spray-dried.

The mixture may be spray-dried by any conventional method without particular limitation as long as a predetermined amount of the metal can be supported.

For example, the mixed dispersion for spray drying is sprayed into hot air, for example, by a nozzle or an atomizer.

The temperature of the hot air is preferably 80 to 500° C., more preferably 120 to 400° C.

When the temperature of the hot air is below 80° C., the drying is unsatisfactory and the metal ingredient cannot be fixed. Accordingly, drying should be again carried out by other methods. In this case, the activity is sometimes unsatisfactory probably due to uneven supporting of the metal ingredient. Further, a desired amount of supported metal cannot be provided probably because the concentration of the metal compound does not occur, sometimes leading to unsatisfactory activity. Further, when washing is carried out in step (d) which will be described later, the metal ingredient is sometimes removed.

Even when the temperature of the hot air is above 500° C., it is impossible to provide a further improvement in the effect of fixing the metal ingredient, the effect of increasing the amount of supported metal as compared with other supporting methods, and the effect of evenly supporting the metal within pores.

Step (d)

The spray-dried powder can be washed. The step (d) is an optional step. Particularly when a metal compound other than the nitrate, for example, a sulfate or a hydrochloride, is used in the step (b), the adoption of washing in the step (d) is preferred. Washing after spray drying can selectively remove sulfate group, chlorine and the like and can provide catalysts having higher activity than catalysts from which the sulfate group, chlorine and the like are not removed.

The washing may be carried out by any method without particular limitation as long as anion in the metal compound can be selectively removed. For example, the spray-dried powder can be washed by suspending the powder in water or warm water, stirring the suspension, and filtering the stirred suspension.

After the washing, the washed solid is dried. The solid may be dried by any conventional method without particular limitation as long as the water content after the drying is not more than approximately 20% by weight. For example, the solid may be dried in a drier at 100 to 150° C. for 0.5 to 2 hours.

Step (e)

The dried product is then heat-treated (calcined).

The heat treatment temperature is preferably 400 to 900° C., more preferably 500 to 800° C.

When the heat treatment temperature is below 400° C., the activity is sometimes unsatisfactory because the organic crystallizing agent cannot be removed. On the other hand, when the heat treatment temperature is above 900° C., the activity is sometimes unsatisfactory.

Preferably, the heat treatment is carried out under an oxidizing atmosphere, preferably in air, from the viewpoint of cost effectiveness. In the present invention, the heat treatment in the oxidizing atmosphere may be followed by heat treatment in a reducing atmosphere, for example, under a hydrogen gas atmosphere. In this case, a previously reduced metal-supported crystalline silicoaluminophosphate catalyst can be obtained.

For example, the reduction treatment is carried out usually at 300 to 600° C. for 0.5 to 5 hours while supplying hydrogen gas.

[2] Metal-Supported Crystalline Silicoaluminophosphate Catalyst

The metal-supported crystalline silicoaluminophosphate catalyst obtained by the above production process has excellent hydrothermal stability.

Specifically, for the metal-supported crystalline silicoaluminophosphate catalyst according to the present invention, the retention of specific surface area as measured by BET after hydrothermal treatment under conditions of (1) an air atmosphere having a moisture content of 10% by volume, (2) a temperature of 700° C., and (3) a treatment time of 20 hours is not less than 80%, or even not less than 85%.

When the retention of specific surface area as measured by BET after the hydrothermal treatment is less than 80%, the activity is sometimes unsatisfactory. The retention of the specific surface area is the proportion between the specific surface area before the hydrothermal treatment and the specific surface area after the hydrothermal treatment. The specific surface area may be compared in a powder form or alternatively may be compared in a molded product form which will be described later.

For the metal-supported crystalline silicoaluminophosphate catalyst according to the present invention, the retention of the crystallinity after the hydrothermal treatment is preferably not less than 80%, or more preferably not less than 85%.

When the retention of the crystallinity after the hydrothermal treatment is less than 80%, the activity is sometimes unsatisfactory.

The retention of the crystallinity is the proportion between the crystallinity before the hydrothermal treatment and the crystallinity after the hydrothermal treatment. The crystallinity may be compared in a powder form or alternatively may be compared in a molded product form which will be described later.

The height of a main peak of an X-ray diffraction spectrum of a metal-supported crystalline silicoaluminophosphate catalyst calcined at 600° C. for 2 hours (2θ=7.50° for SAPO-5, 2θ=21.95° for SAPO-11, 2θ=9.50° for SAPO-34, and 2θ=6.20° for SAPO-37) is regarded as a reference of the retention of the crystallinity after the hydrothermal treatment, and, in the Examples of the present invention, the crystallinity of the metal-supported crystalline silicoaluminophosphate catalyst in Example 1 was presumed to be 1 as a reference value.

In the present invention, the powder of the metal-supported crystalline silicoaluminophosphate after any of the step (c), the step (d), and the step (e) may be molded into a desired shape.

For example, the powder of the metal-supported crystalline silicoaluminophosphate may be molded by a conventional molding method into pellets, beads, plates, honeycomb or the like. In the honeycomb form, a metal-supported crystalline silicoaluminophosphate catalyst layer may be formed, for example, by a wash coating method onto the surface of a honeycomb-shaped metal base material or a ceramic base material. In producing the molded product, for example, conventional binders or molding aids may also be used.

[3] Aluminum Phosphate-Modified Metal-Supported Crystalline Silicoaluminophosphate Catalyst The aluminum phosphate-modified metal-supported crystalline silicoaluminophosphate catalyst according to the present invention comprises: metal-supported crystalline silicoaluminophosphate particles having a surface modified with aluminum phosphate, the content of aluminum phosphate in the catalyst being 0.1 to 40% by weight in terms of $Al_2O_3+P_2O_5$ based on the metal-supported crystalline silicoaluminophosphate particles.

The metal-supported crystalline silicoaluminophosphate particles used in the present invention comprises the crystalline silicoaluminophosphate particles supported a metal thereon. Preferably, the metal is supported on the crystalline silicoaluminophosphate particles by the above method.

In the aluminum phosphate-modified metal-supported crystalline silicoaluminophosphate catalyst according to the present invention, the content of aluminum phosphate present on the surface of the catalyst is preferably 0.1 to 40% by weight, more preferably 1 to 20% by weight, in terms of $Al_2O_3+P_2O_5$ based on the metal-supported crystalline silicoaluminophosphate particles.

When the content of aluminum phosphate is less than 0.1% by weight in terms of $Al_2O_3+P_2O_5$, the effect of improving the low-temperature activity is sometimes unsatisfactory. On the other hand, when the content of aluminum phosphate exceeds 40% by weight in terms of $Al_2O_3+P_2O_5$, the low-temperature activity is saturated and, rather, the activity is sometimes lowered due to the covering of active sites.

Further, preferably, the value of x when aluminum phosphate used in the present invention is represented by $(Al_2)_X \cdot (PO_4)_3$ is 0.1 to 3, more preferably 0.5 to 1.5.

When x is not in the above-defined range, the effect of improving the low-temperature activity is sometimes unsatisfactory.

[4] Process for Producing Aluminum Phosphate-Modified Metal-Supported Crystalline Silicoaluminophosphate Catalyst The process for producing an aluminum phosphate-modified metal-supported crystalline silicoaluminophosphate catalyst according to the present invention comprises the following steps (f) to (i).

Step (f)

A dispersion of the metal-supported crystalline silicoaluminophosphate particles is prepared.

The above metal-supported crystalline silicoaluminophosphate particles are used as the metal-supported crystalline silicoaluminophosphate particles.

The concentration of the dispersion of the crystalline silicoaluminophosphate particles is not particularly limited as long as the dispersion can be mixed with an aqueous aluminum phosphate solution, which will be described later, and can allow a mixed dispersion, for spray drying, having a regulated concentration, which will be described later, to be prepared.

Step (g)

An aqueous aluminum phosphate solution is mixed into the dispersion.

In the aluminum phosphate, the value of x when aluminum phosphate used in the present invention is represented by $(Al_2)_X \cdot (PO_4)_3$ is 0.1 to 3, more preferably 0.5 to 1.5.

The amount of aluminum phosphate used is preferably 0.1 to 40% by weight, more preferably 1 to 20% by weight, in terms of $Al_2O_3+P_2O_5$ based on the metal-supported crystalline silicoaluminophosphate particles.

The concentration of a dispersion prepared by mixing the dispersion of the metal-supported crystalline silicoaluminophosphate particles with the aqueous aluminum phosphate solution is preferably 1 to 50% by weight, more preferably 5 to 20% by weight, on a solid content basis.

When the concentration of the mixed dispersion is less than 1% by weight on a solid content basis, the degree of modification of aluminum phosphate is lowered. On the other hand, the concentration of the mixed dispersion exceeds 50% by weight on a solid content basis, the effect of improving the low-temperature activity is sometimes unsatisfactory probably because the surface of the metal-supported crystalline silicoaluminophosphate particles cannot be evenly modified. Further, in this case, the pH value of the mixed dispersion is enhanced, the crystallinity of the metal-supported crystalline silicoaluminophosphate is so low that the activity is sometimes unsatisfactory.

Step (h)

The mixed dispersion is spray-dried.

Preferably, the mixed dispersion is spray-dried in the same manner as described above. For example, the mixed dispersion for spray drying is sprayed by a nozzle, an atomizer or the like into hot air.

The temperature of the hot air is preferably 80 to 450° C., more preferably 120 to 400° C. When the temperature of the hot air is in the above-defined range, a desired amount of aluminum phosphate can be supported and the catalyst having excellent low-temperature activity according to the present invention can be obtained.

When the temperature of the hot air is below 80° C., due to unsatisfactory drying, the concentration of aluminum phosphate is unsatisfactory and, thus, a predetermined amount of aluminum phosphate modification cannot be provided. On the other hand, when the temperature of the hot air is above 450° C., fine particles of aluminum phosphate are sometimes formed probably due to increased drying speed. In both cases, the effect of improving the low-temperature activity is sometimes unsatisfactory.

Step (i)

The spray-dried product is heat-treated (calcined) at 400 to 700° C., preferably 500 to 600° C.

The heat treatment (calcining) in the step (i) is carried out when the heat-dried product is used as the catalyst.

When the heat treatment temperature is below 400° C., the activity is sometimes unsatisfactory probably because moisture remains unremoved. On the other hand, when the heat treatment temperature is above 700° C., the activity is sometimes unsatisfactory although this varies depending upon the content of the metal ingredient, the amount of modified aluminum phosphate and the like.

The heat treatment is preferably carried out under an oxidizing atmosphere, preferably in air, from the viewpoint of cost effectiveness.

In the present invention, the heat treatment in the oxidizing atmosphere may be followed by heat treatment in a reducing atmosphere, for example, under a hydrogen gas atmosphere.

For example, the reduction treatment is carried out usually at 300 to 600° C. for 0.5 to 5 hours while supplying hydrogen gas.

Thus, an aluminum phosphate-modified metal-supported crystalline silicoaluminophosphate catalyst according to the present invention can be obtained.

As with the powder of the metal-supported crystalline silicoaluminophosphate, the powder of the aluminum phosphate-modified metal-supported crystalline silicoaluminophosphate may be molded after the step (h) or the step (i) into a desired shape.

[5] NOx Reduction Catalyst for Exhaust Gas Treatment

The metal-supported crystalline silicoaluminophosphate catalyst according to the present invention is suitable for use as a catalyst for the purification of an exhaust gas by reducing and converting NOx to nitrogen gas in the presence of a reducing agent such as ammonia.

EXAMPLES

Example 1

Preparation of Metal-Supported Crystalline Silicoaluminophosphate Catalyst (1)

Preparation of Crystalline Silicoaluminophosphate (1)

807.3 g of an aqueous phosphoric acid solution having a concentration of 75% by weight and 2060.7 g of pure water were mixed together to prepare 2868 g of an aqueous phosphoric acid solution having a concentration of 21.1% by weight. 974.9 g of tetraethylammonium hydroxide (TEAH) having a concentration of 35% by weight was mixed thereinto. 440.5 g of pseudo-boehmite powder ($Al_2O_3$ content: 74% by weight) as an aluminum source was then dispersed in the mixture over a period of 10 minutes, and the dispersion was stirred for 15 minutes.

216.5 g of silica sol (manufactured by JGC Catalysts and Chemicals Ltd.: SI-30, $SiO_2$ concentration: 30% by weight) as a silica source was then added to the dispersion over a period of about 10 minutes to prepare a slurry (1) for crystalline silicoaluminophosphate synthesis.

The slurry (1) for crystalline silicoaluminophosphate synthesis was placed into an autoclave and was stirred for 1 hour. The temperature thereof was raised to 170° C. to effect hydrothermal treatment for 48 hours.

Thereafter, the hydrothermally treated slurry was filtered, and the collected solid was thoroughly washed by warm water of 60° C. and was dried at 130° C. for 24 hours. The dried solid was calcined in air at 600° C. for 2 hours to prepare crystalline silicoaluminophosphate (1).

The composition and the average particle diameter of the crystalline silicoaluminophosphate (1) were measured, and the results are shown in Table 1 below. The crystalline silicoaluminophosphate (1) had a specific surface area of 600 $m^2/g$.

500 g of the crystalline silicoaluminophosphate (1) thus obtained was dispersed in 2500 g of water, and the mixture was colloid-milled to prepare a dispersion of crystalline silicoaluminophosphate (1).

Separately, 58.8 g of cupric nitrate trihydrate was dissolved in 2500 g of water to prepare an aqueous copper nitrate solution.

The dispersion of crystalline silicoaluminophosphate (1) was mixed into the aqueous copper nitrate solution to prepare a mixed dispersion for spray drying. The pH of the dispersion was 3.5.

The mixed dispersion for spray drying was then sprayed by an atomizer at a rotation speed of 7000 rpm into a spray drier (hot air temperature: 230° C.), and the resultant powder was calcined at 600° C. for 2 hours to prepare a metal-supported crystalline silicoaluminophosphate catalyst (1).

The content of copper as Cu and the specific surface area were measured for the metal-supported crystalline silicoaluminophosphate catalyst (1) thus obtained, and the results are shown in Table 1 below.

NOx Removing Test (1)

The metal-supported crystalline silicoaluminophosphate catalyst (1) and an alumina powder (JGC Catalysts and Chemicals Ltd.: AP-1) as a binder were mixed together at a mixing ratio of 80/20 in terms of solid weight ratio. Water was added thereto, and the mixture was thoroughly kneaded and was then extruded with an extruding machine (nozzle diameter: 3 mmφ). The molded product was dried at 130° C. for 24 hours. The dried product was ground into particles with a diameter of 3 to 5 mm. The particles were calcined at 600° C. for 2 hours to obtain a metal-supported crystalline silicoaluminophosphate catalyst (1) for testing.

10 cc of the metal-supported crystalline silicoaluminophosphate catalyst (1) for testing was packed into an atmospheric fixed bed flow-type reaction tube. While flowing a reaction gas (NO: 500 ppm, $NH_3$: 500 ppm, $O_2$: 10 vol %, $N_2$: balance) into the reaction tube at a flow rate of 600 cc/min, the system was brought to a steady state at reaction temperatures of 150° C., 200° C., 300° C., and 400° C. At each point, the NOx removing rate was determined by the following equation. The results are shown in Table 2 below.

$$X=[(\{NOx\}in-\{NOx\}out)/\{NOx\}in]\times 100$$

where X represents NOx removal rate (%); {NOx}in represents the concentration of nitrogen oxide gas at inlet; and {NOx}out represents the concentration of nitrogen oxide gas at outlet.

Hydrothermal Resistance Measurement (1)

In the same manner as described above, 50 cc of the metal-supported crystalline silicoaluminophosphate catalyst (1) for testing was packed into a hydrothermal reaction tube. The temperature was raised to 700° C., and the metal-supported crystalline silicoaluminophosphate catalyst (1) was hydrothermally treated for 20 hours while supplying an air having a moisture content of 10% by volume into the tube at a flow rate of 50 cc/min.

The specific surface area of the hydrothermally treated metal-supported crystalline silicoaluminophosphate catalyst (1) for testing was measured and was compared with the specific surface area (shown in Table 1) of the metal-supported crystalline silicoaluminophosphate catalyst (1) obtained by calcining at 600° C. for 2 hours to determine a specific surface area retention. The results are shown in Table 2 below.

Further, a peak height at 2θ=9.50° was measured by X-ray diffractometry for the hydrothermally treated metal-supported crystalline silicoaluminophosphate catalyst (1) for testing and the metal-supported crystalline silicoaluminophosphate catalyst (1) for testing obtained by calcining at 600° C. for 2 hours, and the peak heights for the two samples were compared to determine a crystallinity retention which is shown in Table 2 below.

For the metal-supported crystalline silicoaluminophosphate catalyst (1) for testing subjected to hydrothermal treatment in the hydrothermal resistance measurement, the NOx removing test was carried out in the same manner as described above, and the results are shown in Table 2 below.

Example 2

Preparation of Metal-Supported Crystalline Silicoaluminophosphate Catalyst (2)

A crystalline silicoaluminophosphate (2) was prepared in the same manner as in Example 1, except that, after the washing, drying and calcining were not carried out.

3000 g of a dispersion having a solid content of 16.7% by weight was then prepared from the crystalline silicoaluminophosphate (2) obtained by washing and was colloid-milled to prepare a dispersion of the crystalline silicoaluminophosphate (2).

Separately, 68.6 g of cupric nitrate trihydrate was dissolved in 2500 g of water to prepare an aqueous copper nitrate solution.

An aqueous copper nitrate solution was then mixed into the dispersion of the crystalline silicoaluminophosphate (2) while maintaining the dispersion of the crystalline silicoaluminophosphate (2) to pH 3.5 by the addition of dilute nitric acid to prepare a mixed dispersion for spray drying.

The dispersion of the crystalline silicoaluminophosphate (2) was then subjected to spray drying and calcining in the same manner as in Example 1 to prepare a metal-supported crystalline silicoaluminophosphate catalyst (2).

The content of copper as Cu and the specific surface area were measured for the metal-supported crystalline silicoaluminophosphate catalyst (2). The results are shown in Table 1 below.

Further, for the metal-supported crystalline silicoaluminophosphate catalyst (2), a NOx removing test and a hydrothermal resistance test were carried out in the same manner as in Example 1, and the results are shown in Table 2 below.

Example 3

Preparation of Metal-Supported Crystalline Silicoaluminophosphate Catalyst (3)

A metal-supported crystalline silicoaluminophosphate catalyst (3) was prepared in the same manner as in Example 1, except that the amount of cupric nitrate trihydrate was changed to 25.5 g.

The content of copper as Cu in the resultant metal-supported crystalline silicoaluminophosphate catalyst (3) and the specific surface area of the metal-supported crystalline silicoaluminophosphate catalyst (3) were then measured, and the results are shown in Table 1 below.

Further, for the metal-supported crystalline silicoaluminophosphate catalyst (3), a NOx removing test and a hydrothermal resistance test were carried out in the same manner as in Example 1, and the results are shown in Table 2 below.

Example 4

Preparation of Metal-Supported Crystalline Silicoaluminophosphate Catalyst (4)

A metal-supported crystalline silicoaluminophosphate catalyst (4) was prepared in the same manner as in Example 1, except that the amount of cupric nitrate trihydrate was changed to 137 g.

The content of copper as Cu in the resultant metal-supported crystalline silicoaluminophosphate catalyst (4) and the specific surface area of the metal-supported crystalline silicoaluminophosphate catalyst (4) were then measured, and the results are shown in Table 1 below.

Further, for the metal-supported crystalline silicoaluminophosphate catalyst (4), a NOx removing test and a hydrothermal resistance test were carried out in the same manner as in Example 1, and the results are shown in Table 2 below.

Example 5

Preparation of Metal-Supported Crystalline Silicoaluminophosphate Catalyst (5)

A metal-supported crystalline silicoaluminophosphate catalyst (5) was prepared in the same manner as in Example 1, except that the spray drying temperature was changed to 120° C.

The content of copper as Cu in the resultant metal-supported crystalline silicoaluminophosphate catalyst (5) and the specific surface area of the metal-supported crystalline silicoaluminophosphate catalyst (5) were then measured, and the results are shown in Table 1 below.

Further, for the metal-supported crystalline silicoaluminophosphate catalyst (5), a NOx removing test and a hydrothermal resistance test were carried out in the same manner as in Example 1, and the results are shown in Table 2 below.

Example 6

Preparation of Metal-Supported Crystalline Silicoaluminophosphate Catalyst (6)

A metal-supported crystalline silicoaluminophosphate catalyst (6) was prepared in the same manner as in Example 1, except that the spray drying temperature was changed to 250° C.

The content of copper as Cu in the resultant metal-supported crystalline silicoaluminophosphate catalyst (6) and the specific surface area of the metal-supported crystalline silicoaluminophosphate catalyst (6) were then measured, and the results are shown in Table 1 below.

Further, for the metal-supported crystalline silicoaluminophosphate catalyst (6), a NOx removing test and a hydrothermal resistance test were carried out in the same manner as in Example 1, and the results are shown in Table 2 below.

Example 7

Preparation of Metal-Supported Crystalline Silicoaluminophosphate Catalyst (7)

A metal-supported crystalline silicoaluminophosphate catalyst (7) was prepared in the same manner as in Example 1, except that the calcining temperature was changed to 400° C.

The content of copper as Cu in the resultant metal-supported crystalline silicoaluminophosphate catalyst (7) and the specific surface area of the metal-supported crystalline silicoaluminophosphate catalyst (7) were then measured, and the results are shown in Table 1 below.

Further, for the metal-supported crystalline silicoaluminophosphate catalyst (7), a NOx removing test and a hydrothermal resistance test were carried out in the same manner as in Example 1, and the results are shown in Table 2 below.

Example 8

Preparation of Metal-Supported Crystalline Silicoaluminophosphate Catalyst (8)

A metal-supported crystalline silicoaluminophosphate catalyst (8) was prepared in the same manner as in Example 1, except that the calcining temperature was changed to 700° C.

The content of copper as Cu in the resultant metal-supported crystalline silicoaluminophosphate catalyst (8) and the specific surface area of the metal-supported crystalline silicoaluminophosphate catalyst (8) were then measured, and the results are shown in Table 1 below.

Further, for the metal-supported crystalline silicoaluminophosphate catalyst (8), a NOx removing test and a hydrothermal resistance test were carried out in the same manner as in Example 1, and the results are shown in Table 2 below.

Example 9

Preparation of Metal-Supported Crystalline Silicoaluminophosphate Catalyst (9)

A metal-supported crystalline silicoaluminophosphate catalyst (9) was prepared in the same manner as in Example 1, except that 80 g of ferrous nitrate hexahydrate was used instead of 58.8 g of cupric nitrate trihydrate.

The content of iron as Fe in the resultant metal-supported crystalline silicoaluminophosphate catalyst (9) and the specific surface area of the metal-supported crystalline silicoaluminophosphate catalyst (9) were then measured, and the results are shown in Table 1 below.

Further, for the metal-supported crystalline silicoaluminophosphate catalyst (9), a NOx removing test and a hydrothermal resistance test were carried out in the same manner as in Example 1, and the results are shown in Table 2 below.

Example 10

Preparation of Metal-Supported Crystalline Silicoaluminophosphate Catalyst (10)

A mixed dispersion for spray drying was prepared in the same manner as in Example 1. The mixed dispersion for spray drying was then sprayed by an atomizer at a rotation speed of 7000 rpm into a spray drier (hot air temperature: 250° C.). The powder thus obtained was dispersed in warm water of 50° C. The dispersion was stirred for 10 minutes and was then filtered, and the collected solid was thoroughly washed by warm water of 50° C. and was dried at 130° C. for 24 hours. The dried solid was calcined at 600° C. for 2 hours to prepare a metal-supported crystalline silicoaluminophosphate catalyst (10).

The content of copper as Cu in the resultant metal-supported crystalline silicoaluminophosphate catalyst (10) and the specific surface area of the metal-supported crystalline silicoaluminophosphate catalyst (10) were then measured, and the results are shown in Table 1 below. It was found that the sulfate group content was significantly reduced.

Further, for the metal-supported crystalline silicoaluminophosphate catalyst (10), a NOx removing test and a hydrothermal resistance test were carried out in the same manner as in Example 1, and the results are shown in Table 2 below.

Comparative Example 1

Preparation of Metal-Supported Crystalline Silicoaluminophosphate Catalyst (R1)

A crystalline silicoaluminophosphate (1) was prepared in the same manner as in Example 1. 500 g of the crystalline silicoaluminophosphate (1) thus obtained was dispersed in 2500 g of water, and the mixture was colloid-milled to prepare a dispersion of crystalline silicoaluminophosphate (1).

Separately, 58.8 g of cupric nitrate trihydrate was dissolved in 2500 g of water to prepare an aqueous copper nitrate solution.

The dispersion of crystalline silicoaluminophosphate (1) was mixed into the aqueous copper nitrate solution. The dispersion was adjusted to pH 4.5 and was then ion-exchanged by stirring at 50° C. for 2 hours, followed by filtration. The separated solid was dried at 130° C. for 24 hours. The dried product was calcined in air at 600° C. for 2 hours to prepare a metal-supported crystalline silicoaluminophosphate catalyst (R1).

The content of copper as Cu in the resultant metal-supported crystalline silicoaluminophosphate catalyst (R1) and the specific surface area of the metal-supported crystalline silicoaluminophosphate catalyst (R1) were then measured, and the results are shown in Table 1 below.

Further, for the metal-supported crystalline silicoaluminophosphate catalyst (R1), a NOx removing test and a hydrothermal resistance test were carried out in the same manner as in Example 1, and the results are shown in Table 2 below.

Comparative Example 2

Preparation of Metal-Supported Crystalline Silicoaluminophosphate Catalyst (R2)

A metal-supported crystalline silicoaluminophosphate catalyst (R2) was prepared in the same manner as in Comparative Example 1, except that, after the ion exchange, the dispersion of the crystalline silicoaluminophosphate (1) was adjusted to pH 7.0 to precipitate the copper component.

The content of copper as Cu in the resultant metal-supported crystalline silicoaluminophosphate catalyst (R2) and the specific surface area of the metal-supported crystalline silicoaluminophosphate catalyst (R2) were then measured, and the results are shown in Table 1 below.

Further, for the metal-supported crystalline silicoaluminophosphate catalyst (R2), a NOx removing test and a hydrothermal resistance test were carried out in the same manner as in Example 1, and the results are shown in Table 2 below.

Comparative Example 3

Preparation of Metal-Supported Crystalline Silicoaluminophosphate Catalyst (R3)

A washed crystalline silicoaluminophosphate (2) was prepared in the same manner as in Example 2. 3000 g of a dispersion having a solid content of 16.7% by weight was prepared from the washed crystalline silicoaluminophosphate (2) and was colloid-milled to prepare a dispersion of the crystalline silicoaluminophosphate (2).

The dispersion of the crystalline silicoaluminophosphate (2) was then sprayed by an atomizer at a rotation speed of 7000 rpm into a spray drier (hot air temperature: 230° C.) to obtain a powder of a crystalline silicoaluminophosphate (R3).

Separately, 58.8 g of cupric nitrate trihydrate was dissolved in 2500 g of water to prepare an aqueous copper nitrate solution.

500 g of the powder of the crystalline silicoaluminophosphate (R3) and 2500 g of water were mixed into an aqueous copper nitrate solution. The dispersion was adjusted to pH 4.5 and was then ion-exchanged by stirring at 50° C. for 2 hours. The dispersion was then adjusted to pH 7.0 to precipitate the copper component. The precipitate was then collected by filtration, was dried at 130° C. for 24 hours, and was then calcined in air at 600° C. for 2 hours to prepare a metal-supported crystalline silicoaluminophosphate catalyst (R3).

The content of copper as Cu in the resultant metal-supported crystalline silicoaluminophosphate catalyst (R3) and the specific surface area of the metal-supported crystalline silicoaluminophosphate catalyst (R3) were then measured, and the results are shown in Table 1 below.

Further, for the metal-supported crystalline silicoaluminophosphate catalyst (R3), a NOx removing test and a hydrothermal resistance test were carried out in the same manner as in Example 1, and the results are shown in Table 2 below.

Comparative Example 4

Preparation of Metal-Supported Crystalline Silicoaluminophosphate Catalyst (R4)

A crystalline silicoaluminophosphate (1) was prepared in the same manner as in Example 1.

Separately, 58.8 g of cupric nitrate trihydrate was dissolved in 2500 g of water to prepare an aqueous copper nitrate solution.

500 g of the crystalline silicoaluminophosphate (1) was dispersed in the aqueous copper nitrate solution, and the dispersion was colloid milled. The colloid-milled dispersion was then heated at 130° C. for 24 hours to evaporate water and to dry the residue. The dried product was then calcined in air at 600° C. for 2 hours to prepare a metal-supported crystalline silicoaluminophosphate catalyst (R4).

The content of copper as Cu in the resultant metal-supported crystalline silicoaluminophosphate catalyst (R4) and the specific surface area of the metal-supported crystalline silicoaluminophosphate catalyst (R4) were then measured, and the results are shown in Table 1 below.

Further, for the metal-supported crystalline silicoaluminophosphate catalyst (R4), a NOx removing test and a hydrothermal resistance test were carried out in the same manner as in Example 1, and the results are shown in Table 2 below.

Comparative Example 5

Preparation of Metal-Supported Crystalline Silicoaluminophosphate Catalyst (R5)

A metal-supported crystalline silicoaluminophosphate catalyst (R5) was prepared in the same manner as in Comparative Example 4, except that 80 g of ferrous nitrate hexahydrate was used instead of 58.8 g of cupric nitrate trihydrate.

The content of iron as Fe in the resultant metal-supported crystalline silicoaluminophosphate catalyst (R5) and the specific surface area of the metal-supported crystalline silicoaluminophosphate catalyst (R5) were then measured, and the results are shown in Table 1 below.

Further, for the metal-supported crystalline silicoaluminophosphate catalyst (R5), a NOx removing test and a hydrothermal resistance test were carried out in the same manner as in Example 1, and the results are shown in Table 2 below.

TABLE 1

| | Metal-supported crystalline silicoaluminophosphate | | | | | | | Active ingredient metal | | |
|---|---|---|---|---|---|---|---|---|---|---|
| | Crystalline silicoaluminophosphate | | | | | | Heat | | Supported amount | |
| | Type | Particle diameter, μm | $SiO_2$, wt % | $Al_2O_3$, wt % | $P_2O_5$, wt % | Spray drying Temp., ° C. | Washing after spray draying | treatment Temp., ° C. | Metal species | (in terms of metal), wt % | Specific surface area, $m^2/g$ |
| Ex. 1 | SAPO-34 Calcined product | 2.5 | 10 | 40 | 50 | 230 | — | 600 | Cu | 3.0 | 530 |
| Ex. 2 | SAPO-34 Product washed after synthesis | 2.5 | 10 | 40 | 50 | 230 | — | 600 | Cu | 3.0 | 580 |

TABLE 1-continued

| | Crystalline silicoaluminophosphate | | | | | | Heat | Active ingredient metal | | |
|---|---|---|---|---|---|---|---|---|---|---|
| | Type | Particle diameter, μm | $SiO_2$, wt % | $Al_2O_3$, wt % | $P_2O_5$, wt % | Spray drying Temp., °C. | Washing after spray draying | treatment Temp., °C. | Metal species | Supported amount (in terms of metal), wt % | Specific surface area, $m^2/g$ |
| Ex. 3 | SAPO-34 Calcined product | 2.5 | 10 | 40 | 50 | 230 | — | 600 | Cu | 1.3 | 580 |
| Ex. 4 | SAPO-34 Calcined product | 2.5 | 10 | 40 | 50 | 230 | — | 600 | Cu | 7.0 | 490 |
| Ex. 5 | SAPO-34 Calcined product | 2.5 | 10 | 40 | 50 | 120 | — | 600 | Cu | 3.0 | 530 |
| Ex. 6 | SAPO-34 Calcined product | 2.5 | 10 | 40 | 50 | 250 | — | 600 | Cu | 3.0 | 530 |
| Ex. 7 | SAPO-34 Calcined Product | 2.5 | 10 | 40 | 50 | 230 | — | 400 | Cu | 3.0 | 540 |
| Ex. 8 | SAPO-34 Calcined product | 2.5 | 10 | 40 | 50 | 230 | — | 700 | Cu | 3.0 | 520 |
| Ex. 9 | SAPO-34 Calcined product | 2.5 | 10 | 40 | 50 | 230 | — | 600 | Fe | 3.0 | 580 |
| Ex. 10 | SAPO-34 Calcined product | 2.5 | 10 | 40 | 50 | 250 | Done | 600 | Cu | 2.9 | 580 |
| Comp. Ex. 1 | SAPO-34 Calcined product | 2.5 | 10 | 40 | 50 | Ion exchange | — | 600 | Cu | 1.3 | 560 |
| Comp. Ex. 2 | SAPO-34 Calcined product | 2.5 | 10 | 40 | 50 | Ion exchange + precipitation | — | 600 | Cu | 3.0 | 25 |
| Comp. Ex. 3 | SAPO-34 Product washed after synthesist | 2.5 | 10 | 40 | 50 | Ion exchange + precipitation | — | 600 | Cu | 3.0 | 520 |
| Comp. Ex. 4 | SAPO-34 Calcined product | 2.5 | 10 | 40 | 50 | Impregnation | — | 600 | Cu | 3.0 | 530 |
| Comp. Ex. 5 | SAPO-34 Calcined product | 2.5 | 10 | 40 | 50 | Impregnation | — | 600 | Fe | 3.0 | 530 |

TABLE 2

| | Hydrothermal treatment test (1) | | | Hydrothermal treatment test (2) | | | NOx removing test | | | | | | | |
|---|---|---|---|---|---|---|---|---|---|---|---|---|---|---|
| | Specific surface area | | | Crystallinity | | | Calcined at 600, °C. Reaction temp. (°C.) | | | | Hydrothermal treatment at 700° C. for 20 hours Reaction temp. (°C.) | | | |
| | After calcining $m^2/g$ | After hydrothermal treatment $m^2/g$ | Retention % | After calcining | After hydrothermal treatment | Retention % | 150 % | 200 % | 300 % | 400 % | 150 % | 200 % | 300 % | 400 % |
| Ex. 1 | 420 | 410 | 98 | 1.0 | 0.9 | 90 | 41 | 80 | 94 | 93 | 43 | 82 | 94 | 89 |
| Ex. 2 | 470 | 430 | 91 | 1.1 | 1.0 | 91 | 40 | 78 | 92 | 90 | 41 | 80 | 93 | 90 |
| Ex. 3 | 460 | 450 | 98 | 1.1 | 1.0 | 91 | 31 | 65 | 84 | 88 | 35 | 68 | 85 | 85 |
| Ex. 4 | 390 | 380 | 97 | 0.9 | 0.8 | 89 | 42 | 78 | 93 | 90 | 40 | 81 | 95 | 86 |
| Ex. 5 | 420 | 410 | 98 | 1.0 | 0.9 | 90 | 41 | 80 | 94 | 93 | 43 | 82 | 94 | 89 |
| Ex. 6 | 420 | 410 | 98 | 1.0 | 0.9 | 90 | 41 | 80 | 94 | 93 | 43 | 82 | 94 | 89 |
| Ex. 7 | 420 | 410 | 98 | 1.0 | 0.9 | 90 | 41 | 80 | 94 | 93 | 43 | 82 | 94 | 89 |
| Ex. 8 | 410 | 400 | 98 | 1.0 | 0.9 | 90 | 39 | 78 | 92 | 93 | 38 | 77 | 92 | 90 |
| Ex. 9 | 460 | 450 | 98 | 1.1 | 1.0 | 91 | 13 | 20 | 46 | 65 | 11 | 18 | 43 | 60 |
| Ex. 10 | 470 | 440 | 94 | 1.1 | 1.0 | 91 | 42 | 80 | 94 | 94 | 41 | 80 | 93 | 92 |
| Comp. Ex. 1 | 450 | 440 | 98 | 1.1 | 0.9 | 90 | 20 | 53 | 79 | 84 | 18 | 50 | 75 | 77 |
| Comp. Ex. 2 | 20 | 15 | 75 | 0.2 | Trace | — | <10 | <10 | <10 | <10 | <10 | <10 | <10 | <10 |
| Comp. Ex. 3 | 415 | 290 | 70 | 0.8 | 0.6 | 75 | 29 | 67 | 89 | 90 | 27 | 63 | 85 | 84 |
| Comp. Ex. 4 | 430 | 320 | 76 | 0.9 | 0.71 | 79 | 25 | 48 | 79 | 88 | 18 | 34 | 55 | 62 |
| Comp. Ex. 5 | 430 | 355 | 83 | 0.9 | 0.69 | 77 | <10 | <10 | 35 | 60 | <10 | <10 | 24 | 40 |

Example 11

Preparation of Aluminum Phosphate-Modified Metal-Supported Crystalline Silicoaluminophosphate Catalyst (1)

600 g of the metal-supported crystalline silicoaluminophosphate particles (1) prepared in the same manner as in Example 1 were dispersed in 2400 g of water, and the dispersion was colloid-milled to prepare a dispersion of the metal-supported crystalline silicoaluminophosphate particles (1).

667 g of an aqueous aluminum primary phosphate solution having a solid content of 5% by weight was prepared using aluminum primary phosphate (manufactured by Taki Chemical Co., Ltd.: 100 L, x value=1, solid content: 50% by weight). The dispersion of the metal-supported crystalline silicoaluminophosphate particles (1) was mixed thereinto to prepare a mixed dispersion for spray drying. The dispersion at that time had pH 2.7.

The mixed dispersion for spray drying was then sprayed into a spray drier (hot air temperature: 230° C.) with an atomizer at a rotation speed of 7000 rpm to prepare an aluminum phosphate-modified metal-supported crystalline silicoaluminophosphate catalyst (1).

NOx Removing Test (2)

An aluminum phosphate-modified metal-supported crystalline silicoaluminophosphate catalyst for testing was prepared in the same manner as in the NOx removing test (1), except that an aluminum phosphate-modified metal-supported crystalline silicoaluminophosphate catalyst (1) was used. The aluminum phosphate-modified metal-supported crystalline silicoaluminophosphate catalyst for testing was subjected to a NOx removing test (2) in the same manner as in the NOx removing test (1). The results are shown in Table 4.

Hydrothermal Resistance Measurement (2)

The aluminum phosphate-modified metal-supported crystalline silicoaluminophosphate catalyst (1) was subjected to hydrothermal resistance measurement in the same manner as in the hydrothermal resistance measurement (1). The results are shown in Table 3.

Example 12

Preparation of Aluminum Phosphate-Modified Metal-Supported Crystalline Silicoaluminophosphate Catalyst (2)

An aluminum phosphate-modified metal-supported crystalline silicoaluminophosphate catalyst (2) was prepared in the same manner as in Example 11, except that 667 g of an aqueous aluminum primary phosphate solution having a solid content of 5% by weight prepared using aluminum primary phosphate (manufactured by Taki Chemical Co., Ltd.: Acidophos 75, x value=0.8, solid content: 50% by weight) was used.

The resultant aluminum phosphate-modified metal-supported crystalline silicoaluminophosphate catalyst (2) was subjected to a NOx removing test and evaluation of hydrothermal resistance. The results are shown in Tables 3 and 4.

Example 13

Preparation of Aluminum Phosphate-Modified Metal-Supported Crystalline Silicoaluminophosphate Catalyst (3)

An aluminum phosphate-modified metal-supported crystalline silicoaluminophosphate catalyst (3) was prepared in the same manner as in Example 11, except that 667 g of an aqueous aluminum primary phosphate solution having a solid content of 5% by weight prepared using aluminum primary phosphate (manufactured by Taki Chemical Co., Ltd.: Acidophos 120M, x value=1.3, solid content: 50% by weight) was used.

The resultant aluminum phosphate-modified metal-supported crystalline silicoaluminophosphate catalyst (3) was subjected to a NOx removing test and evaluation of hydrothermal resistance. The results are shown in Tables 3 and 4.

Example 14

Preparation of Aluminum Phosphate-Modified Metal-Supported Crystalline Silicoaluminophosphate Catalyst (4)

An aluminum phosphate-modified metal-supported crystalline silicoaluminophosphate catalyst (4) was prepared in the same manner as in Example 11, except that 605 g of an aqueous aluminum primary phosphate solution having a solid content of 1% by weight was used.

The resultant aluminum phosphate-modified metal-supported crystalline silicoaluminophosphate catalyst (4) was subjected to a NOx removing test and evaluation of hydrothermal resistance. The results are shown in Tables 3 and 4.

Example 15

Preparation of Aluminum Phosphate-Modified Metal-Supported Crystalline Silicoaluminophosphate Catalyst (5)

An aluminum phosphate-modified metal-supported crystalline silicoaluminophosphate catalyst (5) was prepared in the same manner as in Example 11, except that 745 g of an aqueous aluminum primary phosphate solution having a solid content of 10% by weight was used.

The resultant aluminum phosphate-modified metal-supported crystalline silicoaluminophosphate catalyst (5) was subjected to a NOx removing test and evaluation of hydrothermal resistance. The results are shown in Tables 3 and 4.

Example 16

Preparation of Aluminum Phosphate-Modified Metal-Supported Crystalline Silicoaluminophosphate Catalyst (6)

An aluminum phosphate-modified metal-supported crystalline silicoaluminophosphate catalyst (6) was prepared in the same manner as in Example 11, except that the aluminum phosphate-containing mixed dispersion for spray drying was spray-dried at a hot air temperature of 120° C.

The resultant aluminum phosphate-modified metal-supported crystalline silicoaluminophosphate catalyst (6) was subjected to a NOx removing test and evaluation of hydrothermal resistance. The results are shown in Tables 3 and 4.

Example 17

Preparation of Aluminum Phosphate-Modified Metal-Supported Crystalline Silicoaluminophosphate Catalyst (7)

An aluminum phosphate-modified metal-supported crystalline silicoaluminophosphate catalyst (7) was prepared in the same manner as in Example 11, except that the aluminum phosphate-containing mixed dispersion for spray drying was spray-dried at a hot air temperature of 250° C.

The resultant aluminum phosphate-modified metal-supported crystalline silicoaluminophosphate catalyst (7) was subjected to a NOx removing test and evaluation of hydrothermal resistance. The results are shown in Tables 3 and 4.

Example 18

Preparation of Metal-Supported Crystalline Silicoaluminophosphate Catalyst (3)

Metal-supported crystalline silicoaluminophosphate particles (3) were prepared in the same manner as in Example 3.

The content of copper as Cu in the resultant metal-supported crystalline silicoaluminophosphate particles (3) and the specific surface area of metal-supported crystalline silicoaluminophosphate particles (3) were then measured, and the results are shown in Table 3 below.

Further, a metal-supported crystalline silicoaluminophosphate catalyst (3) was prepared in the same manner as in Example 11, except that the metal-supported crystalline silicoaluminophosphate particles (3) were used. The metal-supported crystalline silicoaluminophosphate particles (3) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (8)

An aluminum phosphate-modified metal-supported crystalline silicoaluminophosphate catalyst (8) was prepared in the same manner as in Example 11, except that 600 g of the metal-supported crystalline silicoaluminophosphate particles (3) were used.

The resultant aluminum phosphate-modified metal-supported crystalline silicoaluminophosphate catalyst (8) was subjected to a NOx removing test and evaluation of hydrothermal resistance. The results are shown in Tables 3 and 4.

Example 19

Preparation of Metal-Supported Crystalline Silicoaluminophosphate Catalyst (4)

Metal-supported crystalline silicoaluminophosphate particles (4) were prepared in the same manner as in Example 4.

The content of copper as Cu in the resultant metal-supported crystalline silicoaluminophosphate particles (4) and the specific surface area of metal-supported crystalline silicoaluminophosphate particles (4) were then measured, and the results are shown in Table 3 below.

A metal-supported crystalline silicoaluminophosphate catalyst (4) was prepared in the same manner as in Example 11, except that the metal-supported crystalline silicoaluminophosphate particles (4) were used. The metal-supported crystalline silicoaluminophosphate catalyst (4) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (9)

An aluminum phosphate-modified metal-supported crystalline silicoaluminophosphate catalyst (9) was prepared in the same manner as in Example 11, except that 600 g of the metal-supported crystalline silicoaluminophosphate particles (4) were used.

The aluminum phosphate-modified metal-supported crystalline silicoaluminophosphate catalyst (9) was subjected to a NOx removing test and evaluation of hydrothermal resistance. The results are shown in Tables 3 and 4.

Example 20

Preparation of Metal-Supported Crystalline Silicoaluminophosphate Catalyst (5)

Metal-supported crystalline silicoaluminophosphate particles (5) were prepared in the same manner as in Example 5.

The content of copper as Cu in the resultant metal-supported crystalline silicoaluminophosphate particles (5) and the specific surface area of metal-supported crystalline silicoaluminophosphate particles (5) were then measured, and the results are shown in Table 3 below.

A metal-supported crystalline silicoaluminophosphate catalyst (5) was prepared in the same manner as in Example 11, except that the metal-supported crystalluminophosphate particles (5) were used. The metal-supported crystalline silicoaluminophosphate catalyst (5) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (10)

An aluminum phosphate-modified metal-supported crystalline silicoaluminophosphate catalyst (10) was prepared in the same manner as in Example 11, except that 600 g of the metal-supported crystalline silicoaluminophosphate particles (5) were used.

The aluminum phosphate-modified metal-supported crystalline silicoaluminophosphate catalyst (10) was subjected to a NOx removing test and evaluation of hydrothermal resistance. The results are shown in Tables 3 and 4.

Example 21

Preparation of Metal-Supported Crystalline Silicoaluminophosphate Catalyst (6)

Metal-supported crystalline silicoaluminophosphate particles (6) were prepared in the same manner as in Example 6.

The content of copper as Cu in the resultant metal-supported crystalline silicoaluminophosphate particles (6) and the specific surface area of metal-supported crystalline silicoaluminophosphate particles (6) were then measured, and the results are shown in Table 3 below.

A metal-supported crystalline silicoaluminophosphate catalyst (6) was prepared in the same manner as in Example 11, except that the metal-supported crystalline silicoaluminophosphate particles (6) were used. The metal-supported crystalline silicoaluminophosphate catalyst (6) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (11)

An aluminum phosphate-modified metal-supported crystalline silicoaluminophosphate catalyst (11) was prepared in the same manner as in Example 11, except that 600 g of the metal-supported crystalline silicoaluminophosphate particles (6) were used.
The aluminum phosphate-modified metal-supported crystalline silicoaluminophosphate catalyst (11) was subjected to a NOx removing test and evaluation of hydrothermal resistance. The results are shown in Tables 3 and 4.

Example 22

Preparation of Metal-Supported Crystalline Silicoaluminophosphate Catalyst (7)

Metal-supported crystalline silicoaluminophosphate particles (7) were prepared in the same manner as in Example 7.
The content of copper as Cu in the resultant metal-supported crystalline silicoaluminophosphate particles (7) and the specific surface area of metal-supported crystalline silicoaluminophosphate particles (7) were then measured, and the results are shown in Table 3 below.
A metal-supported crystalline silicoaluminophosphate catalyst (7) was prepared in the same manner as in Example 11, except that the metal-supported crystalline silicoaluminophosphate particles (7) were used. The metal-supported crystalline silicoaluminophosphate catalyst (7) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (12)

An aluminum phosphate-modified metal-supported crystalline silicoaluminophosphate catalyst (12) was prepared in the same manner as in Example 11, except that 600 g of the metal-supported crystalline silicoaluminophosphate particles (7) were used.
The aluminum phosphate-modified metal-supported crystalline silicoaluminophosphate catalyst (12) was subjected to a NOx removing test and evaluation of hydrothermal resistance. The results are shown in Tables 3 and 4.

Example 23

Preparation of Metal-Supported Crystalline Silicoaluminophosphate Catalyst (8)

Metal-supported crystalline silicoaluminophosphate particles (8) were prepared in the same manner as in Example 8.
The content of copper as Cu in the resultant metal-supported crystalline silicoaluminophosphate particles (8) and the specific surface area of metal-supported crystalline silicoaluminophosphate particles (8) were then measured, and the results are shown in Table 3 below.
A metal-supported crystalline silicoaluminophosphate catalyst (8) was prepared in the same manner as in Example 11, except that the metal-supported crystalline silicoaluminophosphate particles (8) were used. The metal-supported crystalline silicoaluminophosphate catalyst (8) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (13)

An aluminum phosphate-modified metal-supported crystalline silicoaluminophosphate catalyst (13) was prepared in the same manner as in Example 11, except that 600 g of the metal-supported crystalline silicoaluminophosphate particles (8) were used.
The aluminum phosphate-modified metal-supported crystalline silicoaluminophosphate catalyst (13) was subjected to a NOx removing test and evaluation of hydrothermal resistance. The results are shown in Tables 3 and 4.

Example 24

Preparation of Metal-Supported Crystalline Silicoaluminophosphate Catalyst (9)

Metal-supported crystalline silicoaluminophosphate particles (9) were prepared in the same manner as in Example 9.
The content of iron as Fe in the resultant metal-supported crystalline silicoaluminophosphate particles (9) and the specific surface area of metal-supported crystalline silicoaluminophosphate particles (9) were then measured, and the results are shown in Table 3 below.
A metal-supported crystalline silicoaluminophosphate catalyst (9) was prepared in the same manner as in Example 11, except that the metal-supported crystalline silicoaluminophosphate particles (9) were used. The metal-supported crystalline silicoaluminophosphate catalyst (9) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (14)

An aluminum phosphate-modified metal-supported crystalline silicoaluminophosphate catalyst (14) was prepared in the same manner as in Example 11, except that 600 g of the metal-supported crystalline silicoaluminophosphate particles (9) were used.
The aluminum phosphate-modified metal-supported crystalline silicoaluminophosphate catalyst (14) was subjected to a NOx removing test and evaluation of hydrothermal resistance. The results are shown in Tables 3 and 4.

Comparative Example 6

Preparation of Aluminum Phosphate-Modified Metal-Supported Crystalline Silicoaluminophosphate Catalyst (R6)

An aluminum phosphate-modified metal-supported crystalline silicoaluminophosphate catalyst (R6) was prepared in the same manner as in Example 11, except that 667 g of an aqueous aluminum primary phosphate solution having a solid content of 0.01% by weight was used.

The aluminum phosphate-modified metal-supported crystalline silicoaluminophosphate catalyst (R6) was subjected to a NOx removing test and evaluation of hydrothermal resistance. The results are shown in Tables 3 and 4.

Comparative Example 7

Preparation of Aluminum Phosphate-Modified Metal-Supported Crystalline Silicoaluminophosphate Catalyst (R7)

An aluminum phosphate-modified metal-supported crystalline silicoaluminophosphate catalyst (R7) was prepared in the same manner as in Example 11, except that 1220 g of aluminum primary phosphate (manufactured by Taki Chemical Co., Ltd.: 100 L, x value=1, solid content: 50% by weight) was used.

The aluminum phosphate-modified metal-supported crystalline silicoaluminophosphate catalyst (R7) was subjected to a NOx removing test and evaluation of hydrothermal resistance. The results are shown in Tables 3 and 4.

Comparative Example 8

Preparation of Metal-Supported Crystalline Silicoaluminophosphate Catalyst (R1)

Metal-supported crystalline silicoaluminophosphate particles (R1) were prepared in the same manner as in Comparative Example 1.

The content of copper as Cu in the resultant metal-supported crystalline silicoaluminophosphate particles (R1) and the specific surface area of the metal-supported crystalline silicoaluminophosphate particles (R1) were then measured, and the results are shown in Table 3 below.

A metal-supported crystalline silicoaluminophosphate catalyst (R1) was prepared in the same manner as in Example 11, except that the metal-supported crystalline silicoaluminophosphate particles (R1) were used. The metal-supported crystalline silicoaluminophosphate catalyst (R1) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (R8)

An aluminum phosphate-modified metal-supported crystalline silicoaluminophosphate catalyst (R8) was prepared in the same manner as in Example 11, except that 600 g of the metal-supported crystalline silicoaluminophosphate particles (R1) were used.

The aluminum phosphate-modified metal-supported crystalline silicoaluminophosphate catalyst (R8) was subjected to a NOx removing test and evaluation of hydrothermal resistance. The results are shown in Tables 3 and 4.

Comparative Example 9

Preparation of Metal-Supported Crystalline Silicoaluminophosphate Catalyst (R5)

Metal-supported crystalline silicoaluminophosphate particles (R2) were prepared in the same manner as in Comparative Example 2.

The content of copper as Cu in the resultant metal-supported crystalline silicoaluminophosphate particles (R2) and the specific surface area of the metal-supported crystalline silicoaluminophosphate particles (R2) were then measured, and the results are shown in Table 3 below.

A metal-supported crystalline silicoaluminophosphate catalyst (R2) was prepared in the same manner as in Example 11, except that the metal-supported crystalline silicoaluminophosphate particles (R2) were used. The metal-supported crystalline silicoaluminophosphate catalyst (R2) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (R9)

An aluminum phosphate-modified metal-supported crystalline silicoaluminophosphate catalyst (R9) was prepared in the same manner as in Example 11, except that 600 g of the metal-supported crystalline silicoaluminophosphate particles (R2) were used.

The aluminum phosphate-modified metal-supported crystalline silicoaluminophosphate catalyst (R9) was subjected to a NOx removing test and evaluation of hydrothermal resistance. The results are shown in Tables 3 and 4.

Comparative Example 10

Preparation of Metal-Supported Crystalline Silicoaluminophosphate Catalyst (R4)

Metal-supported crystalline silicoaluminophosphate particles (R4) were prepared in the same manner as in Comparative Example 4.

The content of copper as Cu in the resultant metal-supported crystalline silicoaluminophosphate particles (R4) and the specific surface area of the metal-supported crystalline silicoaluminophosphate particles (R4) were then measured, and the results are shown in Table 3 below.

A metal-supported crystalline silicoaluminophosphate catalyst (R4) was prepared in the same manner as in Example 11, except that the metal-supported crystalline silicoaluminophosphate particles (R4) were used. The metal-supported crystalline silicoaluminophosphate catalyst (R4) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (R10)

An aluminum phosphate-modified metal-supported crystalline silicoaluminophosphate catalyst (R10) was prepared in the same manner as in Example 11, except that 600 g of the metal-supported crystalline silicoaluminophosphate particles (R4) were used.

The aluminum phosphate-modified metal-supported crystalline silicoaluminophosphate catalyst (R10) was subjected to a NOx removing test and evaluation of hydrothermal resistance. The results are shown in Tables 3 and 4.

Comparative Example 11

Preparation of Metal-Supported Crystalline Silicoaluminophosphate Catalyst (R5)

Metal-supported crystalline silicoaluminophosphate particles (R5) were prepared in the same manner as in Comparative Example 5.

The content of iron as Fe in the resultant metal-supported crystalline silicoaluminophosphate particles (R5) and the specific surface area of the metal-supported crystalline silicoaluminophosphate particles (R5) were then measured, and the results are shown in Table 3 below.

A metal-supported crystalline silicoaluminophosphate catalyst (R5) was prepared in the same manner as in Example 11, except that the metal-supported crystalline silicoaluminophosphate particles (R5) were used. The metal-supported crystalline silicoaluminophosphate catalyst (R5) was subjected to a NOx removing test and evaluation of hydrothermal resistance. The results are shown in Tables 3 and 4.

Preparation of Aluminum Phosphate-Modified Metal-Supported Crystalline Silicoaluminophosphate Catalyst (R11)

An aluminum phosphate-modified metal-supported crystalline silicoaluminophosphate catalyst (R11) was prepared in the same manner as in Example 11, except that 600 g of the metal-supported crystalline silicoaluminophosphate particles (R5) were used.

The aluminum phosphate-modified metal-supported crystalline silicoaluminophosphate catalyst (R11) was subjected to a NOx removing test and evaluation of hydrothermal resistance. The results are shown in Tables 3 and 4.

TABLE 3

| | Metal-supported crystalline silicoaluminophosphate | | | | | | | |
|---|---|---|---|---|---|---|---|---|
| | | | | Active ingredient metal | | | Hydrothermal test (1) Specific surface area | |
| | Spray drying temp. °C. | Washing after spray drying | Heat treatment temp. °C. | Metal species | Supported amount (in terms of metal) wt % | Specific surface area $m^2/g$ | After calcining $m^2/g$ | After hydro-thermal treatment $m^2/g$ | Retention % |
| Ex. 11 | 230 | — | 600 | Cu | 3.0 | 530 | 420 | 410 | 98 |
| Ex. 12 | 230 | — | 600 | Cu | 3.0 | 530 | 420 | 410 | 98 |
| Ex. 13 | 230 | — | 600 | Cu | 3.0 | 530 | 420 | 410 | 98 |
| Ex. 14 | 230 | — | 600 | Cu | 3.0 | 530 | 420 | 410 | 98 |
| Ex. 15 | 230 | — | 600 | Cu | 3.0 | 530 | 420 | 410 | 98 |
| Ex. 16 | 230 | — | 600 | Cu | 3.0 | 530 | 420 | 410 | 98 |
| Ex. 17 | 230 | — | 600 | Cu | 3.0 | 530 | 420 | 410 | 98 |
| Ex. 18 | 230 | — | 600 | Cu | 1.3 | 580 | 460 | 450 | 98 |
| Ex. 19 | 230 | — | 600 | Cu | 7.0 | 490 | 390 | 380 | 97 |
| Ex. 20 | 120 | — | 600 | Cu | 3.0 | 530 | 420 | 410 | 98 |
| Ex. 21 | 250 | — | 600 | Cu | 3.0 | 530 | 420 | 410 | 98 |
| Ex. 22 | 230 | — | 400 | Cu | 3.0 | 540 | 420 | 410 | 98 |
| Ex. 23 | 230 | — | 700 | Cu | 3.0 | 520 | 410 | 400 | 98 |
| Ex. 24 | 230 | — | 600 | Fe | 3.0 | 580 | 460 | 450 | 98 |
| Comp. Ex. 6 | 230 | — | 600 | Cu | 3.0 | 530 | 420 | 410 | 98 |
| Comp. Ex. 7 | 230 | — | 600 | Cu | 3.0 | 530 | 420 | 410 | 98 |
| Comp. Ex. 8 | Ion exchange | — | 600 | Cu | 1.3 | 560 | 450 | 440 | 98 |
| Comp. Ex. 9 | Ion exchange + precipitation | — | 600 | Cu | 3.0 | 25 | 20 | 15 | 75 |
| Comp. Ex. 10 | Impregnation | — | 600 | Cu | 3.0 | 530 | 420 | 320 | 76 |
| Comp. Ex. 11 | Impregnation | — | 600 | Fe | 3.0 | 530 | 430 | 355 | 83 |

| | | | | Aluminum phosphate-modified crystalline silicoaluminophosphate | | | | |
|---|---|---|---|---|---|---|---|---|
| | Hydrothermal test (2) Crystallinity | | | | | Metal-Supported crystalline silica | Aluminum phosphate | |
| | After calcining | After hydro-thermal treatment | Retention % | Spray drying temp. °C. | Heat treatment temp. °C. | alumino-phosphate content wt % | X value $(Al_2) \times (PO_4)_3$ | $Al_2O_3 + P_2O_5$ wt % |
| Ex.11 | 1.0 | 0.9 | 90 | 230 | 600 | 95 | 1 | 5 |
| Ex.12 | 1.0 | 0.9 | 90 | 230 | 600 | 95 | 0.8 | 5 |
| Ex.13 | 1.0 | 0.9 | 90 | 230 | 600 | 95 | 1.3 | 5 |
| Ex.14 | 1.0 | 0.9 | 90 | 230 | 600 | 99 | 1 | 1 |
| Ex.15 | 1.0 | 0.9 | 90 | 230 | 600 | 90 | 1 | 10 |

TABLE 3-continued

|  |  |  |  |  |  |  |  |  |
|---|---|---|---|---|---|---|---|---|
| Ex.16 | 1.0 | 0.9 | 90 | 120 | 600 | 95 | 1 | 5 |
| Ex.17 | 1.0 | 0.9 | 90 | 250 | 600 | 95 | 1 | 5 |
| Ex.18 | 1.1 | 1.0 | 91 | 230 | 600 | 95 | 1 | 5 |
| Ex.19 | 0.9 | 0.8 | 89 | 230 | 600 | 95 | 1 | 5 |
| Ex.20 | 1.0 | 0.9 | 90 | 230 | 600 | 95 | 1 | 5 |
| Ex.21 | 1.0 | 0.9 | 90 | 230 | 600 | 95 | 1 | 5 |
| Ex.22 | 1.0 | 0.9 | 90 | 230 | 600 | 95 | 1 | 5 |
| Ex.23 | 1.0 | 0.9 | 90 | 230 | 600 | 95 | 1 | 5 |
| Ex.24 | 1.1 | 1.0 | 91 | 230 | 600 | 95 | 1 | 5 |
| Comp. Ex. 6 | 1.0 | 0.9 | 90 | 230 | 600 | 99.99 | 1 | 0.01 |
| Comp. Ex. 7 | 1.0 | 0.9 | 90 | 230 | 600 | 50 | 1 | 50 |
| Comp. Ex. 8 | 1.1 | 0.9 | 90 | 230 | 600 | 95 | 1 | 5 |
| Comp. Ex. 9 | 0.2 | Trace | — | 230 | 600 | 95 | 1 | 5 |
| Comp. Ex. 10 | 0.9 | 0.71 | 79 | 230 | 600 | 95 | 1 | 5 |
| Comp. Ex. 11 | 0.9 | 0.69 | 77 | 230 | 600 | 95 | 1 | 5 |

TABLE 4

| | NOx Removing test (1) | | | | | | | | NOx removing test (2) | | | | | | | |
|---|---|---|---|---|---|---|---|---|---|---|---|---|---|---|---|---|
| | Calcined at 600° C. Reaction temp. (° C.) | | | | Hydrothermal treatment at 700° C. for 20 hours Reaction temp. (° C.) | | | | Calcined at 600° C. Reaction temp. (° C.) | | | | Hydrothermal treatment at 700° C. for 20 hours Reaction temp. (° C.) | | | |
| | 150 % | 200 % | 300 % | 400 % | 150 % | 200 % | 300 % | 400 % | 150 % | 200 % | 300 % | 400 % | 150 % | 200 % | 300 % | 400 % |
| Ex. 11 | 41 | 80 | 94 | 93 | 43 | 82 | 94 | 89 | 51 | 89 | 97 | 92 | 50 | 88 | 97 | 92 |
| Ex. 12 | 41 | 80 | 94 | 93 | 43 | 82 | 94 | 89 | 51 | 89 | 97 | 92 | 50 | 88 | 97 | 92 |
| Ex. 13 | 41 | 80 | 94 | 93 | 43 | 82 | 94 | 89 | 51 | 89 | 97 | 92 | 50 | 88 | 97 | 92 |
| Ex. 14 | 41 | 80 | 94 | 93 | 43 | 82 | 94 | 89 | 43 | 82 | 95 | 93 | 42 | 81 | 94 | 91 |
| Ex. 15 | 41 | 80 | 94 | 93 | 43 | 82 | 94 | 89 | 53 | 90 | 98 | 93 | 52 | 89 | 97 | 92 |
| Ex. 16 | 41 | 80 | 94 | 93 | 43 | 82 | 94 | 89 | 51 | 89 | 97 | 92 | 50 | 88 | 97 | 92 |
| Ex. 17 | 41 | 80 | 94 | 93 | 43 | 82 | 94 | 89 | 51 | 89 | 97 | 92 | 50 | 88 | 97 | 92 |
| Ex. 18 | 31 | 65 | 84 | 88 | 35 | 68 | 85 | 85 | 35 | 71 | 86 | 87 | 34 | 70 | 87 | 87 |
| Ex. 19 | 42 | 78 | 93 | 90 | 40 | 81 | 95 | 86 | 50 | 87 | 96 | 91 | 50 | 88 | 97 | 91 |
| Ex. 20 | 41 | 80 | 94 | 93 | 43 | 82 | 94 | 89 | 51 | 89 | 97 | 92 | 50 | 88 | 97 | 92 |
| Ex. 21 | 41 | 80 | 94 | 93 | 43 | 82 | 94 | 89 | 51 | 89 | 97 | 92 | 50 | 88 | 97 | 92 |
| Ex. 22 | 41 | 80 | 94 | 93 | 43 | 82 | 94 | 89 | 51 | 89 | 97 | 92 | 50 | 88 | 97 | 92 |
| Ex. 23 | 39 | 78 | 92 | 93 | 38 | 77 | 92 | 90 | 49 | 84 | 93 | 92 | 48 | 82 | 93 | 92 |
| Ex. 24 | 13 | 20 | 46 | 65 | 11 | 18 | 43 | 60 | 20 | 28 | 55 | 73 | 21 | 30 | 56 | 71 |
| Comp. Ex. 6 | 41 | 80 | 94 | 93 | 43 | 82 | 94 | 89 | 41 | 80 | 94 | 93 | 43 | 82 | 94 | 89 |
| Comp. Ex. 7 | 41 | 80 | 94 | 93 | 43 | 82 | 94 | 89 | 25 | 55 | 75 | 80 | 20 | 53 | 73 | 77 |
| Comp. Ex. 8 | 20 | 53 | 79 | 84 | 18 | 50 | 75 | 77 | 25 | 58 | 82 | 88 | 28 | 59 | 83 | 87 |
| Comp. Ex. 9 | <10 | <10 | <10 | <10 | <10 | <10 | <10 | <10 | <10 | <10 | <10 | <10 | <10 | <10 | <10 | <10 |
| Comp. Ex. 10 | 25 | 48 | 79 | 88 | 18 | 34 | 55 | 62 | 31 | 53 | 82 | 89 | 30 | 49 | 73 | 70 |
| Comp. Ex. 11 | <10 | <10 | 35 | 60 | <10 | <10 | 24 | 40 | 10 | 25 | 42 | 65 | 12 | 27 | 45 | 65 |

The invention claimed is:

1. An aluminum phosphate-modified metal-supported crystalline silicoaluminophosphate NOx-reducing catalyst, comprising:
   metal-supported crystalline silicoaluminophosphate particles having aluminum phosphate on a surface of the particles, the content of aluminum phosphate in the catalyst being 0.1 to 40% by weight in terms of $Al_2O_3+P_2O_5$ based on the metal-supported crystalline silicoaluminophosphate particles.

2. The aluminum phosphate-modified metal-supported crystalline silicoaluminophosphate NOx-reducing catalyst according to claim 1, wherein the value of x in $(Al_2)_x \cdot (PO_4)_3$ representing the aluminum phosphate is 0.1 to 3.

3. The aluminum phosphate-modified metal-supported crystalline silicoaluminophosphate NOx-reducing catalyst according to claim 1, wherein the crystalline silicoaluminophosphate particles are at least one member selected from the group consisting of SAPO-5, SAPO-11, SAPO-34, and SAPO-37.

4. The aluminum phosphate-modified metal-supported crystalline silicoaluminophosphate NOx-reducing catalyst according to claim 1, wherein the crystalline silicoaluminnphosphate is SAPO-34.

5. The aluminum phosphate-modified metal-supported crystalline silicoaluminophosphate NOx-reducing catalyst according to claim 1, wherein the supported metal is a metal of an element selected from the group 8, 9, 10, 11, and 12 elements of the periodic table or a mixture thereof (including an alloy).

6. The aluminum phosphate-modified metal-supported crystalline silicoaluminophosphate NOx-reducing catalyst according to claim 1, wherein the amount of the metal supported is in a range of 0.1 to 10% by weight in terms of metal.

\* \* \* \* \*